United States Patent
Qian et al.

(10) Patent No.: US 7,760,629 B2
(45) Date of Patent: Jul. 20, 2010

(54) AGGREGATE DATA FRAME GENERATION

(75) Inventors: Lu Qian, Solon, OH (US); Douglas A. Smith, Stouffville (CA)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 11/849,713

(22) Filed: Sep. 4, 2007

(65) Prior Publication Data

US 2009/0060009 A1 Mar. 5, 2009

(51) Int. Cl.
*H04J 3/24* (2006.01)
*H04W 4/00* (2009.01)

(52) U.S. Cl. ............... 370/230; 370/235; 370/338; 370/474

(58) Field of Classification Search ............... None
See application file for complete search history.

(56) References Cited

U.S. PATENT DOCUMENTS

| | | | |
|---|---|---|---|
| 6,721,334 B1 * | 4/2004 | Ketcham | 370/473 |
| 6,801,545 B2 * | 10/2004 | Stewart | 370/473 |
| 6,918,034 B1 * | 7/2005 | Sengodan et al. | 713/160 |
| 7,301,948 B2 * | 11/2007 | Omae et al. | 370/392 |
| 7,525,994 B2 * | 4/2009 | Scholte | 370/474 |
| 2003/0081625 A1 | 5/2003 | Matsufuru | |
| 2003/0169769 A1 * | 9/2003 | Ho et al. | 370/473 |
| 2004/0184450 A1 | 9/2004 | Omran | |
| 2005/0226222 A1 | 10/2005 | Qian | |
| 2005/0226273 A1 | 10/2005 | Qian | |
| 2006/0056443 A1 * | 3/2006 | Tao et al. | 370/462 |
| 2006/0251096 A1 | 11/2006 | Metsker | |
| 2007/0025388 A1 | 2/2007 | Abhishek et al. | |
| 2007/0053354 A1 * | 3/2007 | Rudolf et al. | 370/389 |
| 2007/0237120 A1 * | 10/2007 | Xu | 370/338 |
| 2008/0043731 A1 * | 2/2008 | Lim et al. | 370/389 |
| 2009/0228619 A1 * | 9/2009 | Trainin | 710/56 |

OTHER PUBLICATIONS

Cisco IOS Software Configuration Guide for Cisco Aironet 1400 Series Wireless Bridge, Chapter 6, Configuring Packet Concatenation, Cisco IOS Release 12.3(8)JA, Feb. 2006, p. 6-9.

Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment 4(#933): Enhancement for higher Throughput, IEEE P802.11n™/D2.02, May 2007.

(Continued)

*Primary Examiner*—Chi H Pham
*Assistant Examiner*—Soon-Dong D Hyun

(57) ABSTRACT

In an example embodiment, an aggregate frame, such as a A-MSDU aggregate is generated from interleaved frames addressed to various receiver addresses. The incoming frames are regrouped by receiver address. The aggregate frame is generated from the regrouped frames.

16 Claims, 3 Drawing Sheets

OTHER PUBLICATIONS

Jain, et al., Benefits of Packet Aggregation in Ad-Hoc Wireless Network, Department of Computer Science, University of Colorado at Boulder, Aug. 2003.

Zhang, Merl—Frame Aggregation for Hish Efficient MAC, © 2007 Mitsubishi Electric Research Laboratories, http://www.merl.com/projects/frame-agg/.

Written Opinion of the International Searching Authority mailed Mar. 18, 2010; regarding International Application No. PCT/US2008/074742 filed Aug. 29, 2008.

Yuxia Lin et al: "WSNO1-1: Frame Aggregation and Optimal Frame Size Adaptation for IEEE 802.11n WLANs" Global Telecommunciations Conference, 2006. GLOBECOM '06. IEEE, IEEE, P1. Nov. 1, 2006, pp. 1-6, XP031075937.

* cited by examiner

US 7,760,629 B2

AGGREGATE DATA FRAME GENERATION

TECHNICAL FIELD

This application is generally related to generating an aggregate data frame such as an Aggregated Media Access Control Service Data Unit (A-MSDU).

BACKGROUND

Frame aggregation is a technique that can be useful for improving Media Access Control (MAC) efficiency. For example, the Institute of Electrical and Electronic Engineers (IEEE) 802.11n draft specification (see IEEE P802.11n/D2.02 dated May 2007, hereinafter '802.11n draft specification') proposes the A-MSDU to improve MAC efficiency for higher throughputs. The 802.11n draft specification defines a frame format and rules of frame exchanges for A-MSDU; however the 802.11n draft specification does not specify how to generate an A-MSDU.

OVERVIEW OF EXAMPLE EMBODIMENTS

The following presents a simplified summary of the example embodiments in order to provide a basic understanding of some aspects of the example embodiments. This overview is not an extensive overview of the example embodiments. It is intended to neither identify key or critical elements of the example embodiments. Its sole purpose is to present some concepts of the example embodiments in a simplified form as a prelude to the more detailed description that is presented later.

In accordance with an example embodiment there is disclosed herein a method comprising receiving a plurality of data frames, wherein a first group of the plurality of data frames is addressed to a first receiver and a second group of the plurality of data frames is addressed to a second receiver. The plurality of data frames are grouped by destination address. An aggregate data frame is created that is addressed to the first receiver from the grouped data frames.

In accordance with an example embodiment, described herein is an apparatus comprising an input configured to receive a plurality of data frames and logic coupled to the input and configured to group the plurality of data frames by destination address. The plurality of data frames comprise at least one data frame addressed to a first receiver and at least one data frame addressed to a second receiver. The logic is further configured to create an aggregate data frame addressed to the first receiver from the grouped plurality of data frames and to create a second aggregate data frame addressed to the second receiver from the grouped plurality of data frames.

As it will be realized, the example embodiments described herein are capable of modifications in various obvious aspects. Accordingly, the drawing and descriptions herein will be regarded as illustrative in nature and not as restrictive.

BRIEF DESCRIPTION OF THE DRAWINGS

The accompanying drawings incorporated herein and forming a part of the specification, illustrate the example embodiments.

DESCRIPTION OF EXAMPLE EMBODIMENTS

Figure 1:
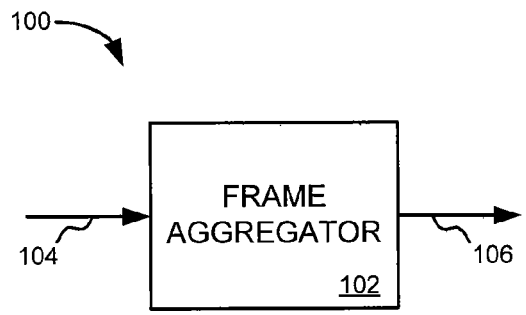
FIG. 1 is a block diagram illustrating an example embodiment of a frame aggregator.

This description provides examples not intended to limit the scope of the claims. The figures generally indicate the features of the examples, where it is understood and appreciated that like reference numerals are used to refer to like elements.

Described herein are example embodiments for implementing data frame aggregation. For example, when packets arrive, a host processor puts the incoming packets into a per access class (AC) incoming queues. A transceiver (such as a network interface card or "NIC") is triggered by an interrupt for the incoming packets and begins assembling A-MSDUs from the per AC in-progress queues. The assembly of an A-MSDU continues until there are either no more packets in the queue, an incoming does not fit into an A-MSDU due to size constraints, or the receiver address of an incoming packet does not match the receiver address of the A-MSDU. The NIC then begins assembling the next A-MSDU. When there are no more packets in the incoming queue, the NIC waits for the next interrupt.

Described in an example embodiment herein, is a method for generating an A-MSDU that includes an intermediate re-grouping (or sorting) the incoming frames based on their receiver addresses during the A-MSDU generating procedure. Re-grouping interleaved incoming data frames by their receiver address can reduce the number of interruptions in the A-MSDU generation process. As a result, an incoming frames has a better chance of being in an A-MSDU and the size of the A-MSDU will increase. In an example embodiment, the time ordering of the incoming frames is retained.

For example, in an example embodiment, if an incoming data stream has the following packets (where the packets are labeled as m-n, where m is the receiver address and n is the sequence number of the packet to address):

1-1, 2-1, 1-2, 1-3, 2-2, 1-4, 2-3, 2-4.

Without regrouping, the resulting A-MSDU with no re-grouping results in two A-MSDUs and 4 MSDUs as follows: [1-1], [2-1], [1-2, 1-3], [2-2], [1-4], [2-3, 2-4]. However, if the packets are regrouped in accordance with an example embodiment before creating the A-MSDUs, the result is two A-MSDUs and no MSDUs as follows: [1-1, 1-2, 1-3, 1-4], [2-1, 2-2, 2-3, 2-4]. It should be noted there is no intentionally added delay waiting for additional packets that could be aggregated using the re-grouping techniques disclosed herein.

Referring now to FIG. 1, there is illustrated an example embodiment of an apparatus 100 for implementing frame aggregation. Apparatus 100 comprises a frame aggregator 102 that has an input 104 for receiving frames and an output 106 that provides frames received at input 104 after being processed by frame aggregator 102.

Frame aggregator 102 comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware.

In operation, input 104 receives a plurality of data frames, such as a data stream. Each data frame of the plurality of data frames has a destination address. The frames are in received in random order. Frames for a first address may be interleaved with frames for a second and/or additional addresses. Logic in frame aggregator 102 is configured to receive the plurality of data frames from input 104 and group the plurality of data frames by destination address. For example, if the data stream received at input 104 comprises a plurality of data frames having a first destination (receiver) address and a second plurality of data frames having a second destination address, the logic in frame aggregator 102 groups the plurality of data frames by destination address. An aggregate frame for the first destination address is created from the re-grouped frames. In particular embodiments, an aggregate frame for the second destination address is also created.

In an example embodiment, frames received at input 104 are stored in a memory associated with the logic of frame aggregator 102. For example, the memory can be a queue, such as an input queue. The memory may be incorporated into frame aggregator 102 or may be external but in data communication with frame aggregator 102. Logic in frame aggregator 102 re-groups the data frames stored in the memory before providing them to output 106. In an example embodiment, frame aggregator 102 begins sorting the plurality of data frames to create an aggregate responsive to an interrupt. As will be described herein (e.g. FIG. 2), a first processor, such as a host processor, can communicate an interrupt to frame aggregator 102 to signal a transfer of data frames is in progress.

In an example embodiment, frames may be processed by another process while being received which can affect how frames are aggregated. For example, frames may be encrypted, such as by CCMP (Counter Mode with Cipher Block Chaining Message Authentication Code Protocol), while they are being received in order to minimize clock cycles. The encryption process may need to know the size of the data being encrypted before encrypting the frame. For example, a first frame with a first destination address may be received at input 104. While this frame is being processed (e.g. encrypted) a second frame with the first destination address is received at input 104. Since the first frame is already being processed, an aggregate frame for the first destination address is created beginning with the second frame. The second frame is not processed before being put into the aggregate. Any subsequent frames for the first destination address received before processing of the first frame is completed is placed into the aggregate unprocessed. For example, if a third frame for the first destination address is received while the first frame is still being processed, the third frame is placed into the aggregate unprocessed. After processing of the first frame is completed, the first frame is provided at output 106, and the aggregate is then processed. For example, if the first frame was being encrypted, after encryption of the first frame is completed, the aggregate frame is encrypted.

Figure 2:
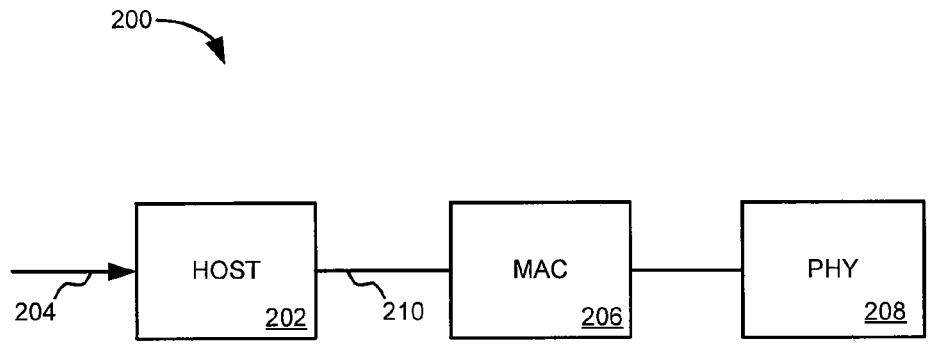
FIG. 2 is an example embodiment of a data communication system.

FIG. 2 is an example embodiment of a data communication system 200. Host processor (Host) 202 receives packets for processing, such as from an input 204. The packets are forwarded from host processor 204 to MAC processor (MAC) 206. MAC processor 206 forwards the frames to Physical Layer Processor (PHY) 208 for transmission across a media. Frame aggregation as described herein can be implemented as part of Host 202, MAC 206 or implemented somewhere on connection 210 between Host 202 and MAC 206. MAC 206 and PHY 208 can be any MAC/PHY implementation, for example MAC 206 and PHY 208 can be part of a wireless transceiver to wirelessly transmit packets. As another example, MAC 206 and PHY 208 can be part of a Network Interface Card (NIC).

For example, as host processor 202 receives frames (such as MSDU frames), the frames are forwarded along connection 210 to MAC 206. In one example embodiment, when the MAC encounters a second frame with a first destination address while processing a first frame with the first destination address, frame aggregation logic creates an aggregate frame (e.g. an A-MSDU) comprising the first and second frames. The frame aggregation logic continues to build the aggregate until there are no more frames to process, a packet will not fit into the A-MSDU due to size constraints, and/or there are no more frames for the first destination address.

In other example embodiments, the frames are processed while they are being transferred from Host 202 to MAC 206. The processing may include encryption, compression, encoding or other processes that transform the data. For example, to save clock cycles, frames may be encrypted as they are received. Because some encryption processes require a size to start encryption, creating an aggregate beginning with a frame that was processed while it was received may waste clock cycles. Therefore, if a second frame is received addressed to a first destination address while the first frame is being processed, aggregate is created with the second frame. Since the size of the aggregate is not yet known, the second frame is not processed. If a third and/or subsequent frames are received while the first frame is still being processed, they are placed into the aggregate without being processed, unless the size of the aggregate will be too large with the frame added, in which case a new (e.g. second) aggregate is created.

Figure 3:
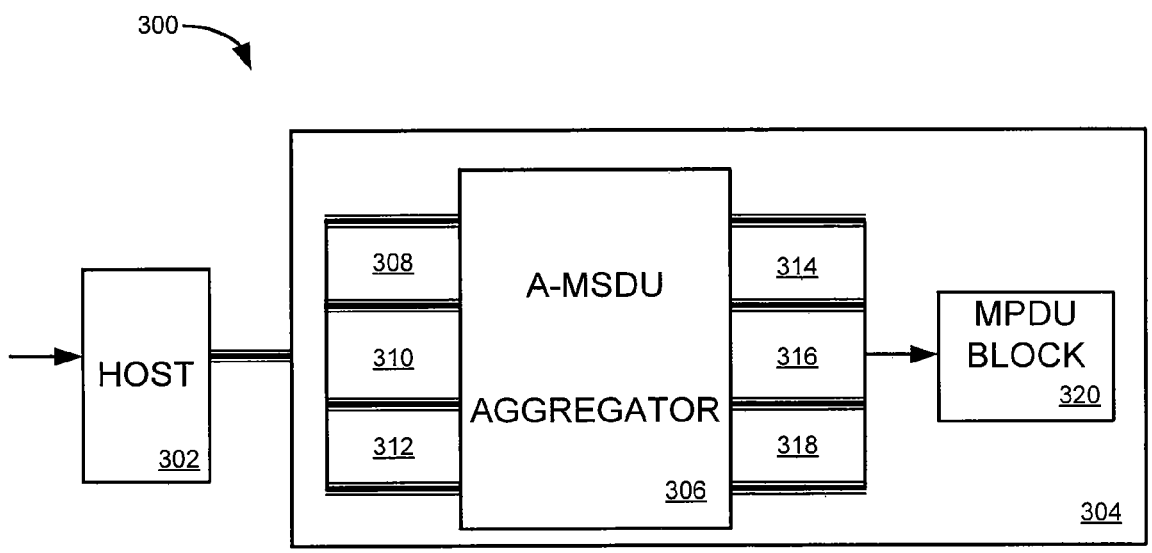
FIG. 3 is a block diagram illustrating an example embodiment of a frame aggregator with a plurality of queues.

FIG. 3 is a block diagram illustrating an example embodiment 300 of a frame aggregator 304 with a plurality of queues. Frame aggregator 304 comprises input queues 308, 310, 312, an A-MSDU aggregator 306 and output queues 314, 316, 318.

In operation, host processor 302 puts frames (e.g. MSDU frames) into one of queues 308, 310, 312 (e.g. Access Class 'AC' in process queues) of frame aggregator 304. In an example embodiment, queues 308, 310, 312 are for different Access Classes (ACs). For example, queue 308 is for a first AC, queue 310 for a second AC, and queue 312 for a third AC. A-MSDU Aggregator 306 comprises logic for sorting the input queues, 308, 310, 312 by destination address and placing the sorted frames into output queues 314, 316, 318. An MPDU (MAC Protocol Data Unit) block 320 is created from frames stored in one or more of output queues 314, 316, 318. As a result, frames can be stored in output queues 314, 316, 318 sorted by AC and destination address.

In an example embodiment, frames are sorted by destination address, and when appropriate aggregated, as they are passed from one of input queues 308, 310, 312 to a corresponding output queue (e.g. one of queues 314, 316, 318). In an example embodiment, if while A-MSDU aggregator 306 is processing a first frame from an input queue (e.g. queue 308) and a subsequent frame having the same destination address as the first frame is received, A-MSDU Aggregator 306 creates an aggregate comprising the first and second frames. Any subsequent frames to the same address as the first and second frames are added until either input queue 308 is empty (processing of the stream has completed), the aggregate is about to exceed a predetermined threshold (in which case a new, or second, aggregate frame is created), or if after sorting a frame is received with a different receiver address than the destination address of the first packet.

In an example embodiment, frames are processed while being received into AC queues 308, 310, 312. For example, frames may be encrypted as they are being received from host 302. For example, A-MSDU Aggregator processes a first frame (e.g. an MSDU frame) for a first destination address from an input queue, e.g. queue 310. If while processing the first frame, a second frame with the same destination address as the first destination address is encountered, A-MSDU aggregator 306 creates an aggregate comprising the second frame. The second frame is not processed while being put into the aggregate. In an example embodiment, the aggregate is stored in a linear buffer in data communication with aggregator 306. Subsequent frames addressed to the first destination address that are received while the first frame is being processed are concatenated onto the aggregate by A-MSDU aggregator 306. If a subsequent frame can't fit into the aggregate because of size limits, an additional aggregate can be created by A-MSDU Aggregator 306. After the first frame is processed, the aggregate is processed. The aggregated frame (e.g. an A-MSDU) is placed into an appropriate output queue (e.g. queue 316) after being processed.

The frame aggregation techniques described herein can be beneficial for operating on congested channels and can work well with lightly loaded channels. For example, the aggregate is created for a destination address while processing of a first frame for the destination address. In a lightly loaded channel, frames would be sent as soon as they are received so frames aggregation is not likely to occur because they wouldn't be stored in the queues for a long enough time period. In a heavily congested channel, the first frame may not be processed immediately, so the frames are re-grouped by receiver address increasing the likelihood that an aggregate can be created, which can alleviate channel congestion.

Figure 4:
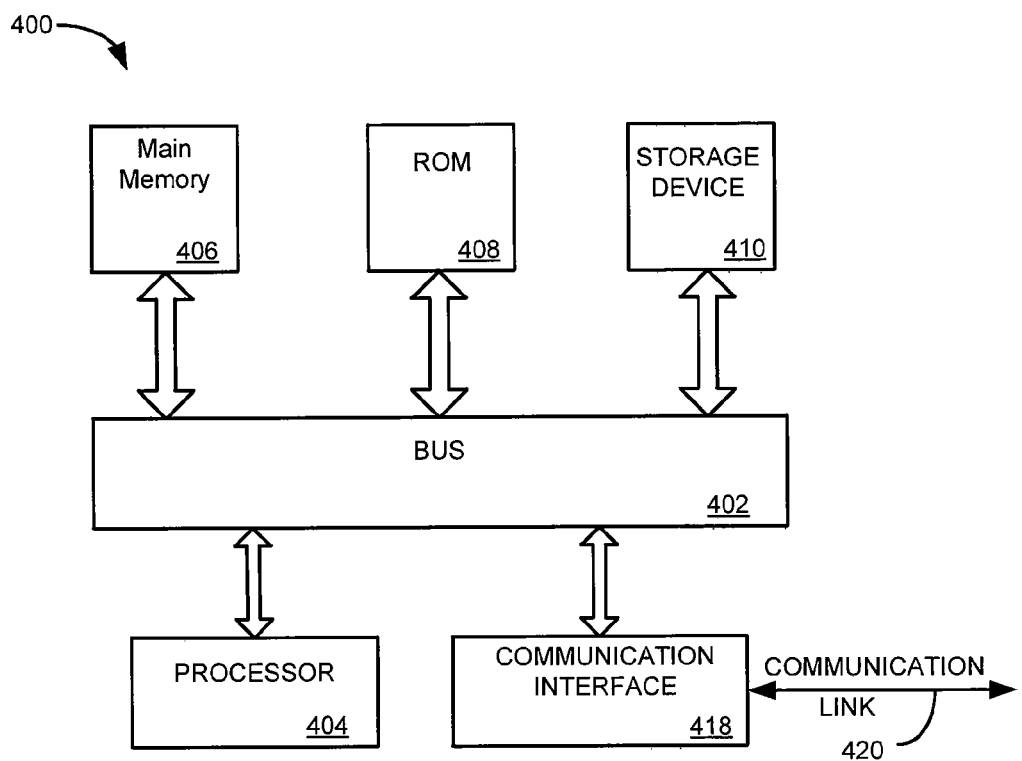
FIG. 4 is a block diagram of a computer system suitable for implementing an example embodiment.

FIG. 4 is a block diagram of a computer system 400 suitable for implementing an example embodiment. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An example embodiment is related to the use of computer system 400 for Aggregate Data Frame Generation. According to one embodiment, Aggregate Data Frame Generation is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the method. Thus, the example embodiments are not limited to any specific combination of hardware circuitry and software.

The term "computer-readable medium" as used herein refers to any medium that participates in providing instructions to processor 404 for execution. Such a medium may take many forms, including but not limited to non-volatile media, and volatile media. Non-volatile media include for example optical or magnetic disks, such as storage device 410. Volatile media include dynamic memory such as main memory 406. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a communication link 420 that is coupled to an external device (not shown). For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Computer system 400 can send messages and receive data, including program codes, through communication link 420, and communication interface 418. If communication link 420 is coupled to the Internet, a server (not shown) might transmit a requested code for an application program through the Internet to communication link 420, and communication interface 418 for execution by processor 404. In accordance with an example embodiment, one such downloaded application provides for aggregate data frame generation as described herein.

Figure 5:
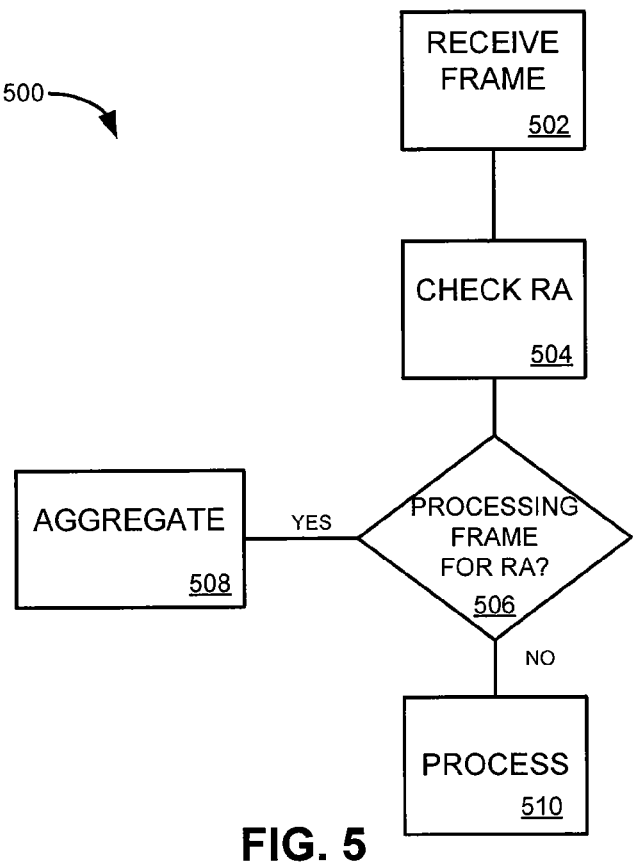
FIG. 5 illustrates a block diagram of a methodology for aggregating frames in accordance with an example embodiment.
Figure 6:
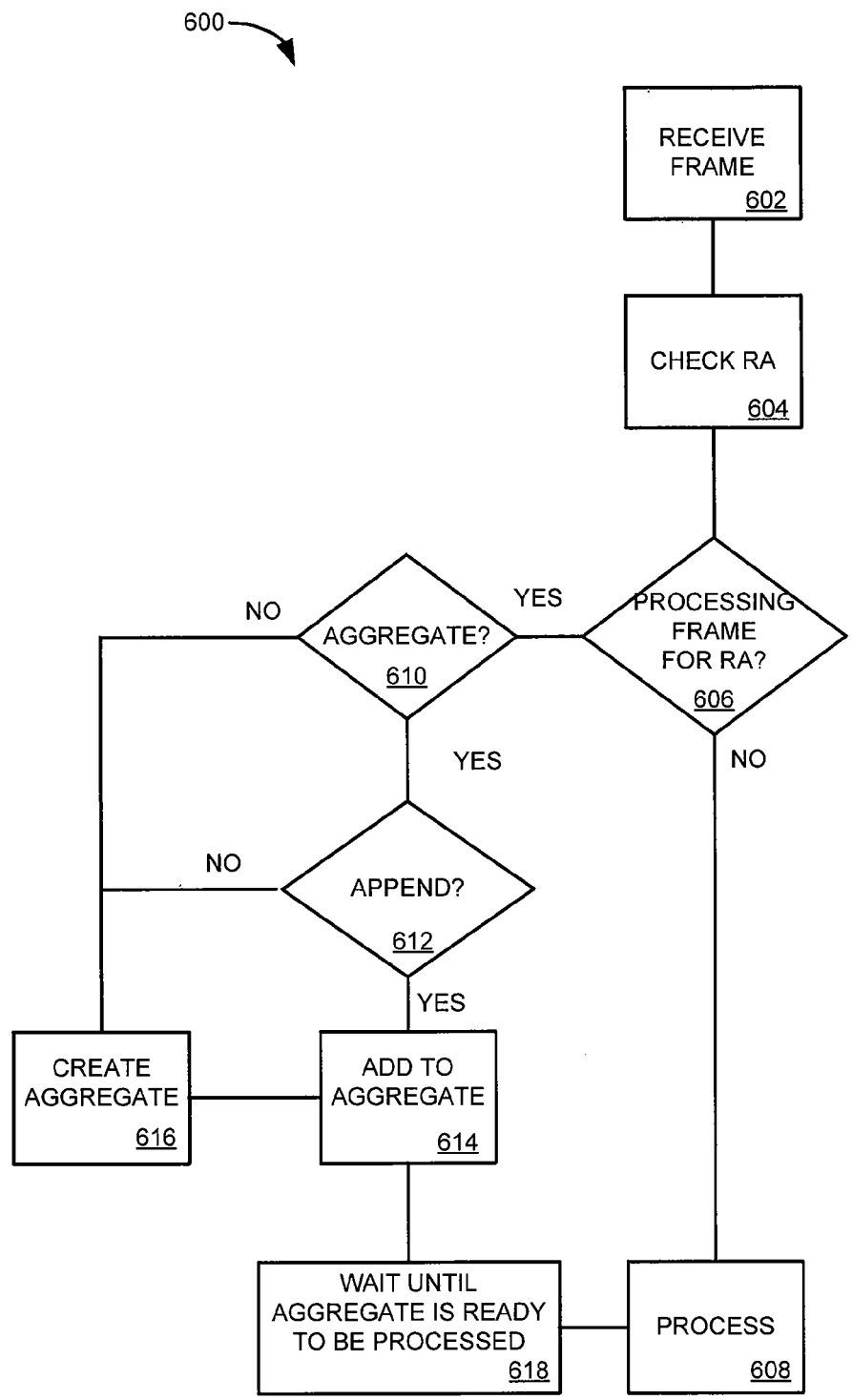
FIG. 6 illustrates a block diagram of a methodology for aggregating frames in accordance with an example embodiment.

In view of the foregoing structural and functional features described above, methodologies in accordance with example embodiments will be better appreciated with reference to FIGS. 5 and 6. While, for purposes of simplicity of explanation, the methodologies of FIGS. 5 and 6 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with the example embodiment. Embodiments of the aforementioned methodologies are suitably adapted to be implemented in hardware, software, or a combination thereof.

Referring to FIG. 5, there is illustrated a methodology 500 in accordance with an example embodiment. The example embodiment processes one frame at a time from a received data stream. For example, a host processor may place data packets into an incoming queue, which are aggregated when appropriate before being transmitted (e.g. by a MAC processor).

At 502, an incoming packet (which may also be referred to herein as a frame or data frame) is received. In an example embodiment, a plurality of data frames is received, e.g. placed into an incoming queue. The plurality of data frames may contain data frames addressed to multiple (e.g. first and second) receivers.

At 504, the receiver address (RA, also referred to herein as the destination address) is ascertained. At 506, a determination is made as to whether a frame for the same receiver address (RA) is being processed. If a frame addressed to the same receiver address is being processed (YES) then the frame is aggregated. For example, if an aggregate has already been created for the receiver address, the frame can be added to the aggregate (or a new aggregate can be created if size of the current aggregate exceeds a predetermined size threshold). If an aggregate has not yet been created, then an aggregate can be created. If at 506 it is determined that no frames with the same receiver address are being processed (NO), then at 510 the frame is processed (e.g. placed in an outbound queue or otherwise forwarded to the next stage of the transmission process).

For example, a data stream is received with multiple frames addressed to a first destination address and a second destination address. When a first frame is received addressed to the first receiver, the receiver address is determined and since there is no preceding packet being processed with the same address, the frame is processed (e.g sent). If a second (and subsequent) frames addressed to the first receiver are received while the first frame is being processed, then an aggregate is created and subsequent frames are appended to the aggregate as long as the aggregate does not exceed a predetermined size limit.

Similarly, when a second frame is received addressed to the second receiver, the receiver address is determined and since there is no preceding packet being processed with the same address, the frame is processed. If a second (and subsequent) frames addressed to the second receiver are received while the second frame is being processed, then an aggregate is created and subsequent frames are appended to the aggregate as long as the aggregate does not exceed a predetermined size limit.

In an example embodiment, the data frames are received sorted by access class. For example, a plurality of incoming queues may be used to enable a host processor to store frames by access class.

In particular embodiments, the assembling of an aggregate frame ceases due to one or more conditions. For example, assembly of an aggregate may stop responsive to the incoming queue being empty. As another example, assembly of an aggregate stops responsive to the size of the aggregate data frame exceeding a predetermined threshold. If this condition occurs, a new aggregate may be created. As another example, assembly of an aggregate stops responsive to a data frame in the queue having a different address than the first receiver.

Referring to FIG. 6, there is illustrated a methodology 600 in accordance with an example embodiment. This example methodology can be employed in implementations where a packet is processed as it is being received. For example, a MAC may begin encryption of the frame as it receives the frame from the host.

At 602, an incoming packet (which may also be referred to herein as a frame or data frame) is received. In an example embodiment, a plurality of data frames is received, e.g. placed into an incoming queue. The plurality of data frames may contain data frames addressed to multiple (e.g. first and second) receivers.

At 604, the receiver address (RA, also referred to herein as the destination address) is ascertained. The receiver address corresponds to a destination address for the frame. At 606, a determination is made as to whether a frame for the receiver address is being processed. If at 606 it is determined that there are no frames being processed for the receiver address (NO), then at 608 the frame is processed.

If at 606 a determination is made that a frame for the same receiver address is being processed (YES), at 610 a determination is made as to whether an aggregate already exists for the receiver address.

If an aggregate for the receiver address if found at 610 (YES), at 612 a determination is made whether the frame can be appended or concatenated onto the aggregate. For example, the aggregate data frame may have a maximum size. If adding the frame to the aggregate data frame would make the aggregate exceed the maximum size, then the data frame is not added to the aggregate.

If at 612 a determination is made that the frame can be appended to the aggregate data frame (YES), then at 614 the frame is appended to the aggregate data frame.

If at 610 no aggregate exists for the receiver address (NO) at 616 a new aggregate is created. Moreover, if at 612 it is determined that the frame cannot be added to the aggregate (NO), then at 616 a new aggregate is created.

At 618, the aggregate is stored until processing at 608. For example, the aggregate is stored in memory and data frames can be added to the aggregate while the first data frame is being processed. As another example, the aggregate can be stored until it reaches the maximum allowable size. The aggregate may also be stored until processing of the incoming data stream is completed (e.g. the incoming queue is empty).

For example, if a data stream is received (e.g. stored in a queue) with three packets (e.g. MSDU packets) addressed to a first receiver address, the first packet is received and the receiver address is checked. Since there are no frames in process for the receiver address, the frame is processed as it is received. Processing may include encryption. For example, to save clock cycles a frame may be encrypted while it is being received from the incoming queue.

If while the first packet addressed to the first receiver address is still being processed a second packet addressed to the first receiver addressed is received, then an aggregate (such as an A-MSDU) is created and the second packet is inserted into the aggregate. After the first packet is processed, the aggregate is processed. If the third packet addressed to the first receiver address is received while the first packet is still being processed, the third packet is appended to the aggregate, provided this does not increase the size of the aggregate over a predetermined limit. If the aggregate is too large to accept the third packet, then a new aggregate is created starting with the third packet. Packets may be added to the third aggregate while the first packet and/or the first aggregate is being processed.

The aforementioned methodologies are suitable to create A-MSDU frames. A plurality of MSDU packets are aggregated into A-MSDU frames in accordance with the aforementioned methodologies.

What has been described above includes example implementations. It is, of course, not possible to describe every conceivable combination of components or methodologies, but one of ordinary skill in the art will recognize that many further combinations and permutations are possible. Accordingly, the appended claims are intended to embrace all such alterations, modifications and variations that fall within the spirit and scope of the appended claims interpreted in accordance with the breadth to which they are fairly, legally and equitably entitled.

The invention claimed is:

1. A method, comprising:
   receiving a plurality of data frames having an associated time ordering, wherein a first group of the plurality of data frames is addressed to a first receiver and a second group of the plurality of data frames is addressed to a second receiver;
   grouping, by a processor, the plurality of data frames by destination address; and
   creating, by the processor, an aggregate data frame addressed to the first receiver from the grouped plurality of data frames, wherein the time ordering of the data frames is maintained in the aggregate data frame;
   wherein the data frames are received in a queue; and
   wherein the creating an aggregate data frame addressed to the first receiver stops responsive to a data frame in the queue having a different address than the first receiver.

2. A method according to claim 1, wherein each of the plurality of data frames has an access class, the grouping the plurality of data frames further comprises sorting by access class.

3. A method according to claim 1, wherein the creating an aggregate data frame addressed to the first receiver stops responsive to the queue being empty.

4. A method according to claim 1, wherein the creating an aggregate data frame addressed to the first receiver stops responsive to the size of the aggregate data frame exceeding a predetermined threshold.

5. A method according to claim 1, further comprising:
   receiving a first data frame addressed to the first receiver;
   processing the first data frame, by the processor, as the frame is being received; and
   receiving a second data frame addressed to the first receiver while processing of the first data frame;
   wherein the aggregate data frame is created, by the processor, responsive to receiving the second data frame, the aggregate data frame comprises the second data frame, and wherein a time ordering of the first and second data frames is maintained in the aggregate data frame.

6. A method according to claim 5, further comprising:
   receiving a third data frame addressed to the first receiver; and
   adding the third data frame, by the processor, to the aggregate frame, wherein a time ordering of the third data frame is maintained when added to the aggregate frame.

7. A method according to claim 5, the processing the first data frame further comprises encrypting the first data frame as it is being received.

8. A method according to claim 5, further comprising processing the aggregate data frame after processing the first data frame has completed.

9. A method according to claim 1, wherein the data frames are media access control service data unit (MSDU) frames.

10. An apparatus, comprising:
    an input to receive a plurality of data frames; and
    a memory coupled to the input for storing the plurality of data frames;
    logic coupled to the input, the logic groups the plurality of data frames by destination address;
    wherein the plurality of data frames comprises at least one data frame addressed to a first receiver and at least one data frame addressed to a second receiver;
    wherein the logic is responsive to receiving a first data frame addressed to the first receiver to begin processing the frame;
    wherein the logic is responsive to receiving a second data frame addressed to the first receiver to determine whether processing of the first frame is still being performed; and
    wherein the logic creates a first aggregate data frame addressed to the first receiver from the grouped plurality of data frames responsive to receiving the second data frame while processing of the first frame is still being performed
    wherein the logic stops adding data frames to the first aggregate data frame responsive to encountering a data frame in the memory having a different address than the first receiver.

11. An apparatus according to claim 10, wherein the logic sorts the plurality of data frames and create the first aggregate data frame and responsive to an interrupt.

12. An apparatus according to claim 10, wherein the logic receives a third data frame addressed to the first receiver while processing the first data frame; and
    wherein the logic adds the third data frame to the first aggregate data frame without processing the third data frame.

13. An apparatus according to claim 12, wherein the logic processes the first aggregate data frame after processing the first data frame.

14. An apparatus according to claim 13, wherein the processing first data frame comprises encrypting the first data frame and processing the aggregate data comprises encrypting the aggregate data frame.

15. An apparatus, comprising:
    means for receiving a plurality of data frames having an associated time ordering, wherein a first group of the plurality of data frames is addressed to a first receiver and a second group of the plurality of data frames is addressed to a second receiver;
    means for grouping the plurality of data frames by destination address;
    means for creating an aggregate data frame addressed to the first receiver from the sorted plurality of data frames, wherein the time ordering of the data frames is maintained in the aggregate data frame; and
    means for creating a second aggregate data frame addressed to the second receiver from the sorted plurality of data frames, wherein the time ordering of the data frames is maintained in the second aggregate data frame.

16. An apparatus according to claim 15, wherein the data frames are media access control service data unit (MSDU) frames.

* * * * *